United States Patent [19]

Nishikawa

[11] 4,092,678

[45] May 30, 1978

[54] BIAS SETTING METHOD FOR MAGNETIC RECORDING-REPRODUCING APPARATUS

[75] Inventor: Masao Nishikawa, Nagoya, Japan

[73] Assignee: Shin-Shirasuna Electric Corp., Najoya, Japan

[21] Appl. No.: 751,036

[22] Filed: Dec. 16, 1976

[30] Foreign Application Priority Data

Dec. 23, 1975 Japan ................................ 50-154209

[51] Int. Cl.² ........................ G11B 27/36; G11B 5/47
[52] U.S. Cl. ....................................... 360/31; 360/66
[58] Field of Search ............................ 360/31, 66, 27

[56] References Cited

U.S. PATENT DOCUMENTS

| 3,300,590 | 1/1967 | Cronin | 360/66 |
| 3,564,160 | 2/1971 | Temes et al. | 360/31 |
| 3,704,349 | 11/1972 | Goshima et al. | 360/66 |
| 4,011,585 | 3/1977 | Sunagz | 360/66 |

Primary Examiner—Vincent P. Canney

[57] ABSTRACT

A first signal of a relatively high frequency and second signal of a relatively low frequency are alternately generated, the amplitudes of these signals varying with time. Then the first and second signals are recorded, together with a predetermined bias signal, on a magnetic recording medium by a tape recorder, and thereafter the thus recorded first and second signals are reproduced. Subsequently, detection is made of a point of time when the third harmonic component of the reproduced second signal comes to have a predetermined level ratio with respect to the reproduced second signal. The level of the reproduced second signal at the point of time to be detected as mentioned above is held, and at the same time the peak level of the reproduced first signal is also held. Thus, the bias for the tape recorder is set up at a required value on the basis of the difference or ratio between the held first and second signals.

1 Claim, 2 Drawing Figures

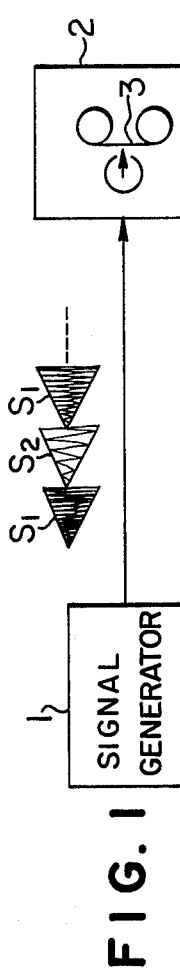
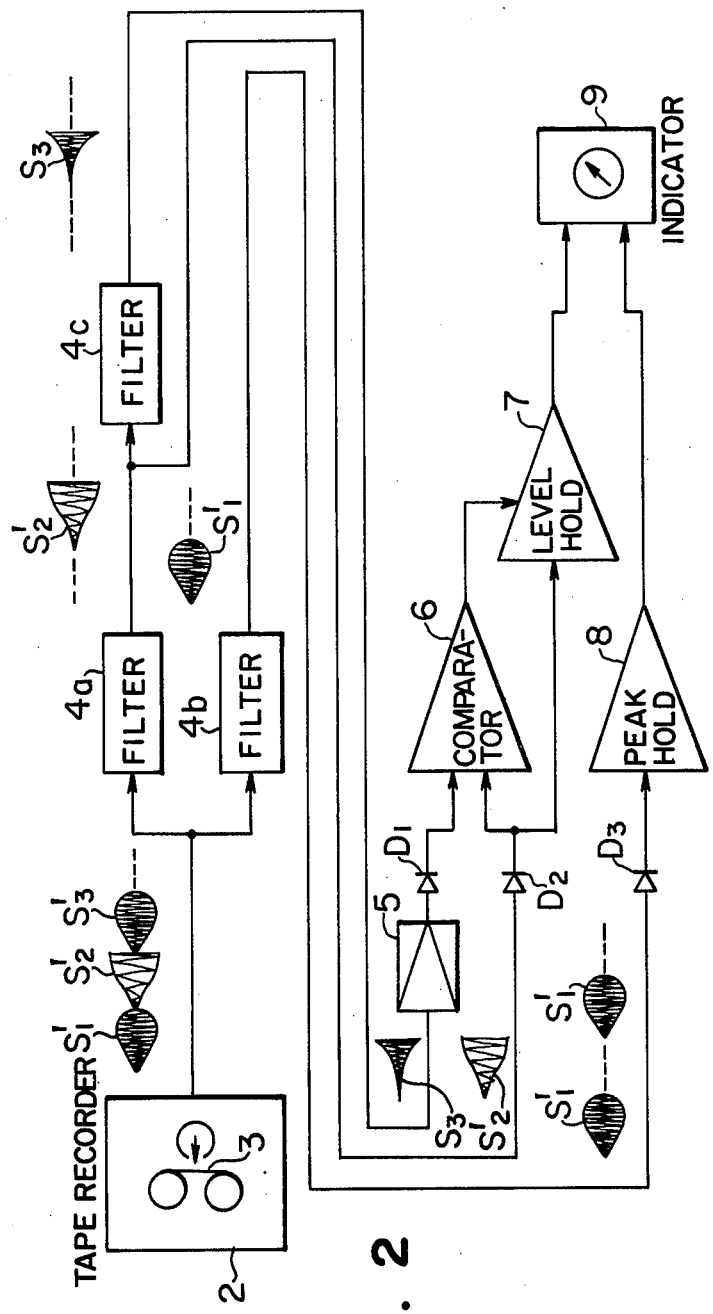

BIAS SETTING METHOD FOR MAGNETIC RECORDING-REPRODUCING APPARATUS

BACKGROUND OF THE INVENTION

1. Field of the Invention

This invention relates to a method of setting up bias for a magnetic tape recorder.

2. Description of the Prior Art

In magnetic recording-reproducing apparatus such as a tape recorder, it is required that alternate current bias be optimally set up depending on the kind of magnetic recording medium such as magnetic tape which is used therewith. To meet such a requirement, there has heretofore been proposed an arrangement which is so designed that a desired one of several different bias values can be manually selected. With such a conventional arrangement, however, it is essential for the operator to previously determine which one of those different bias values is suitable for the magnetic recording medium such as a magnetic tape in use; this may cause erroneous manipulation, and thus the operator is required to have a high level of technical skill. Moreover, a number of bias values are needed in order that any desired type of magnetic recording medium may be utilized, and difficulties have been experienced in an attempt to construct a change-over mechanism capable of covering such a number of bias values to be selectively set up.

Heretofore, the following methods have been proposed to set up bias values for a magnetic medium:

(1) A method wherein a signal of a constant level having a relatively low frequency (usually, 333 Hz or 400 Hz) is used as recording signal, a bias value (level) superimposed on the recording signal is increased or decreased to cause the signal recorded on the recording medium to have a maximum level, and the bias value (maximum sensitivity bias) at which the foregoing maximum level of the recorded signal is achieved is set up as the optimum bias value.

(2) A method wherein a signal of a constant level having a relatively high frequency (for example, 6.3 KHz or 10 KHz, etc.) is used as recording signal, a bias value is applied which is higher than that (maximum sensitivity bias) at which the signal recorded on the magnetic recording medium is caused to have the maximum level when the bias value superimposed on the recording signal is increased or decreased, and the level of the signal recorded on the magnetic recording medium is made to be a constant level which is attenuated at a predetermined rate with respect to the aforementioned maximum level. The recording signal mentioned above is of a relatively low level (generally, about 20 dB down from the reference level).

(3) A method wherein two signals are used as recording signals, one of which is of a relatively low frequency (for example, 333 Hz) and the other of which is of a relatively high frequency (for example, 8 KHz), and the bias value superimposed on each of the recording signals is increased or decreased as in the above-described method (2), and an optimum bias value is set up so as to control the difference between the levels of the recording signals at which maximum magnetic change quantity is produced in the magnetic recording medium by each of the recording signals. The "maximum magnetic change quantity" referred to above corresponds to "maximum operational level", which means the recording signal level at which the third harmonic distortion of the recorded signal having the aforementioned relatively low frequency (for example, 333 Hz) reaches 5%. (This can also be said about the signal having the above-mentioned relatively high frequency (for example, 8 KHz), but the third harmonic distortion of such a signal is as high as 24 KHz and thus it cannot be reproduced, the level of which is substantially equal to the maximum output level of the 8 KHz signal.

With the method (1) in which only a low frequency signal is used, however, it may sometimes happen that in the case of a high quality tape, a suitable bias value cannot be achieved for high-frequency recording by means of bias setting related to such a low frequency alone.

By the method (2), the foregoing drawback of the method (1) can be eliminated since a recording signal of a high frequency is used therein; however, the method (2) has the drawback that a suitable bias value cannot be achieved with respect to high-input operation or low-frequency operation, due to the fact that the recording signal level is relatively low.

In the method (3), as mentioned above, to eliminate the aforementioned drawbacks of the methods (1) and (2), two signals, one of which is of a low frequency and the other of which is of a high frequency, are used, and as the recording signal level, use is made of a level in the vicinity of the maximum operational level. Thus, the method (3) is suitable for setting-up of bias. However, it is disadvantageous in that it requires very complicated manipulation and a variety of measuring instruments and is time-consuming and expensive in respect of the setting-up operation.

SUMMARY OF THE INVENTION

Accordingly, it is an object of this invention to provide a novel and improved bias setting method for magnetic recording-reproducing apparatus, which is capable of eliminating the aforementioned drawbacks of the prior art.

According to one aspect of this invention, there is provided a bias setting method for magnetic recording-reproducing apparatus, which comprises the steps of alternately generating a first signal of a relatively high frequency the amplitude of which varies with time, and a second signal of a relatively low frequency the amplitude of which varies with time, recording said first and second signals, together with a bias signal of a predetermined value, on a magnetic recording medium by said magnetic recording-reproducing apparatus, reproducing the recorded first and second signals, detecting a point of time when the third harmonic component of the reproduced second signal comes to have a predetermined level ratio with respect to the reproduced second signal, holding the level of the reproduced second signal at said point of time while at the same time holding the peak level of the reproduced first signal, and setting said bias at a required value based on the difference or ratio between the levels of the held first and second signals.

Other objects, features and advantages of this invention will become apparent from the following description taken in conjunction with the accompanying drawings.

BRIEF DESCRIPTION OF THE DRAWINGS

FIGS. 1 and 2 are views illustrating the method according one example of this invention, respectively.

DESCRIPTION OF THE PREFERRED EMBODIMENT

In the method of this invention, as shown in FIG. 1, a signal generator 1 is prepared which is so designed as to alternately generate a first signal $S_1$ having a relatively high frequency, for example 8 KHz the amplitude of which varies with time and a second signal $S_2$ having a relatively low frequency, for example 333 Hz the amplitude of which also varies with time. The signal train $S_1 - S_2 - S_1 - \ldots$ derived from the signal generator 1 is recorded by a magnetic recording-reproducing apparatus such as tape recorder 2 on a magnetic recording medium such as a magnetic tape 3 mounted thereon together with a bias signal of a predetermined value. Thereafter, the signals thus recorded are reproduced by the tape recorder 2, so that there is obtained a reproduced signal train $S_1' - S_2' - S_1' \ldots$ which consists of an alternate arrangement of the reproduced signals $S_1'$ and $S_2'$. In this case, the reproduced signal $S_1'$ is one which was obtained by reproducing the first signal $S_1$ recorded on the magnetic tape 3, and the reproduced signal $S_2'$ is one which was obtained by reproducing the second signal $S_2$ recorded on the magnetic tape 3. The reproduced signal $S_2'$ contains its third harmonic component. (It can be practically considered that the reproduced signal $S_1'$, the frequency of which is as high as 8KHz, contains no third harmonic component, since the latter cannot be reproduced due to the fact that the frequency thereof is as high as 24 KHz.) Subsequently, the aforementioned reproduced signal train $S_1' - S_2' - S_1' - \ldots$ derived from the magnetic tape recorder is passed to a high-pass filter circuit 4a and a low-pass filter circuit 4b, so that the reproduced signals $S_1'$ and $S_2'$ are obtained at the output sides of the filter circuits 4a and 4b respectively in such a manner that these signals $S_1'$ and $S_2'$ occur intermittently and are staggered in terms of time from each other by a period of time which corresponds to each one segment of such signals, as will be seen from FIG. 2. Thereafter, part of the reproduced signal $S_2'$ is imparted to a high-pass filter circuit 4c to take out a signal $S_3$ which is constituted by the aforementioned third harmonic distortion component contained in the reproduced signal $S_2$. In this way, the reproduced signal $S_1'$ corresponding to the first signal $S_1$, reproduced signal $S_2'$ corresponding to the second signal $S_2$ and signal $S_3$ which is the third harmonic distortion component of the reproduced signal $S_2'$ are separately taken out.

The "maximum operational level" described above with respect to the method (3) will now be recalled, which as mentioned above, corresponds to a recording signal level at which the third harmonic distortion of the second signal (333 Hz in this example) reaches 5% of the second signal. Thus, in the illustrated method of this invention, the reproduced signal $S_2'$ separately obtained and having the third harmonic component removed therefrom as mentioned above, is applied to one input terminal of a comparator circuit 6, through a diode $D_2$ if desired, and the aforementioned signal $S_3$ which is constituted by the third harmonic component of the reproduced signal $S_2'$ is amplified in an amplifier circuit 5 having an amplification factor of twenty times and then passed to the other input terminal of the comparator circuit 6, through a diode $D_1$ if desired. The comparator circuit 6 is arranged such that it provides an output signal when the signals imparted to the two input terminals thereof agree with each other in respect of their levels. Thus, the comparator circuit 6 provides an output signal at a point of time when the aforementioned "maximum operational level" is reached, that is when the level of the signal $S_3$ constituted by the third harmonic component of the reproduced signal $S_2'$ corresponding to the second signal $S_2$, reaches 5% of the level of the reproduced signal $S_2'$, with the amplification factor of the amplifier circuit 5 being selected to be twenty times as mentioned above. Then, the output signal derived from the comparator circuit 6 is imparted to a level holding circuit 7 so that the level of the reproduced signal $S_2'$ at the aforementioned point of time is held thereby. At the same time, the reproduced signal $S_1'$ separately taken out as mentioned above is passed to a peak holding circuit 8, through a diode $D_3$ if desired, so that the peak level of the signal $S_1'$ is held thereby. The peak holding circuit 8 is arranged such that it holds the average value of each maximum level of the reproduced signal $S_2'$ for a period corresponding to two or three segments or sections of the reproduced signal $S_2'$. The peak holding circuit 8 is also arranged such that while it is holding the average value of the maximum levels of the reproduced signal $S_2'$ and a certain maximum level thereof, if a maximum level lower than the levels held therein occurs in succession, then it holds the lower maximum level. The outputs of the holding circuits 7 and 8 are applied to an indicator 9 which may be constituted, for example, by a ratio meter which is adapted to operate on the basis of the difference or ratio between the outputs of the holding circuits 7 and 8, and thus the required bias can be set up by adjusting the bias for the magnetic recording-reproducing apparatus so that the indicator 9 indicates an optimum value.

As will be appreciated from the above explanation, according to this invention, it is possible to achieve the aforementioned method (3) with a greatly simplified arrangement, and yet it is possible to eliminate the drawbacks of the method (3); thus, even an unskilled operator can set up the required bias value easily, quickly and exactly.

Although, in the foregoing, a description has been given of the case where the outputs of the holding circuits 7 and 8 are applied to the indicator 9 such as ratio meter, it will readily be apparent to those skilled in the art that it is also possible to utilize means for automatically setting up the required bias for the magnetic recording-reproducing apparatus 2 on the basis of the difference or ratio between the outputs of the holding circuits 7 and 8 or any other suitable means, without departing from the scope of this invention.

It will also be apparent to those skilled in the art that waveforms other than those of the signals $S_1$ and $S_2$ may be employed, provided their amplitudes vary with time.

In the foregoing example, the amplifier circuit 5 was separately provided, but such an amplifier circuit may be contained in the comparator circuit 6. The amplification factor of the amplifier circuit 5 may be selected as desired depending on the function of the comparator circuit 6.

While this invention has been described and illustrated with respect to one specific embodiment thereof, it is to be understood that the foregoing description is only exemplary of the invention and various modifications and changes may be made therein within the spirit and scope of the invention as defined in the appended claim.

I claim:

1. A bias setting method for magnetic recording-reproducing apparatus, which comprises the steps of alternately generating a first signal of a relatively high frequency the amplitude of which varies with time and a second signal of a relatively low frequency the amplitude of which varies with time, recording said first and second signals, together with a bias signal of a predetermined value, on a magnetic recording medium by said magnetic recording-reproducing apparatus, reproducing the recorded first and second signals, detecting a point of time when the third harmonic component of the reproduced second signal comes to have a predetermined level ratio with respect to the reproduced second signal, holding the level of the reproduced second signal at said point of time while at the same time holding the peak level of the reproduced first signal, and setting said bias at a required value on the basis of the difference or ratio between the levels of the held first and second signals.

* * * * *